July 15, 1952 R. D. CHIPP 2,603,775
RADAR TARGET INDICATING SYSTEM FOR FIRE CONTROL
Filed Aug. 2, 1946 3 Sheets-Sheet 1

Inventor
RODNEY D. CHIPP

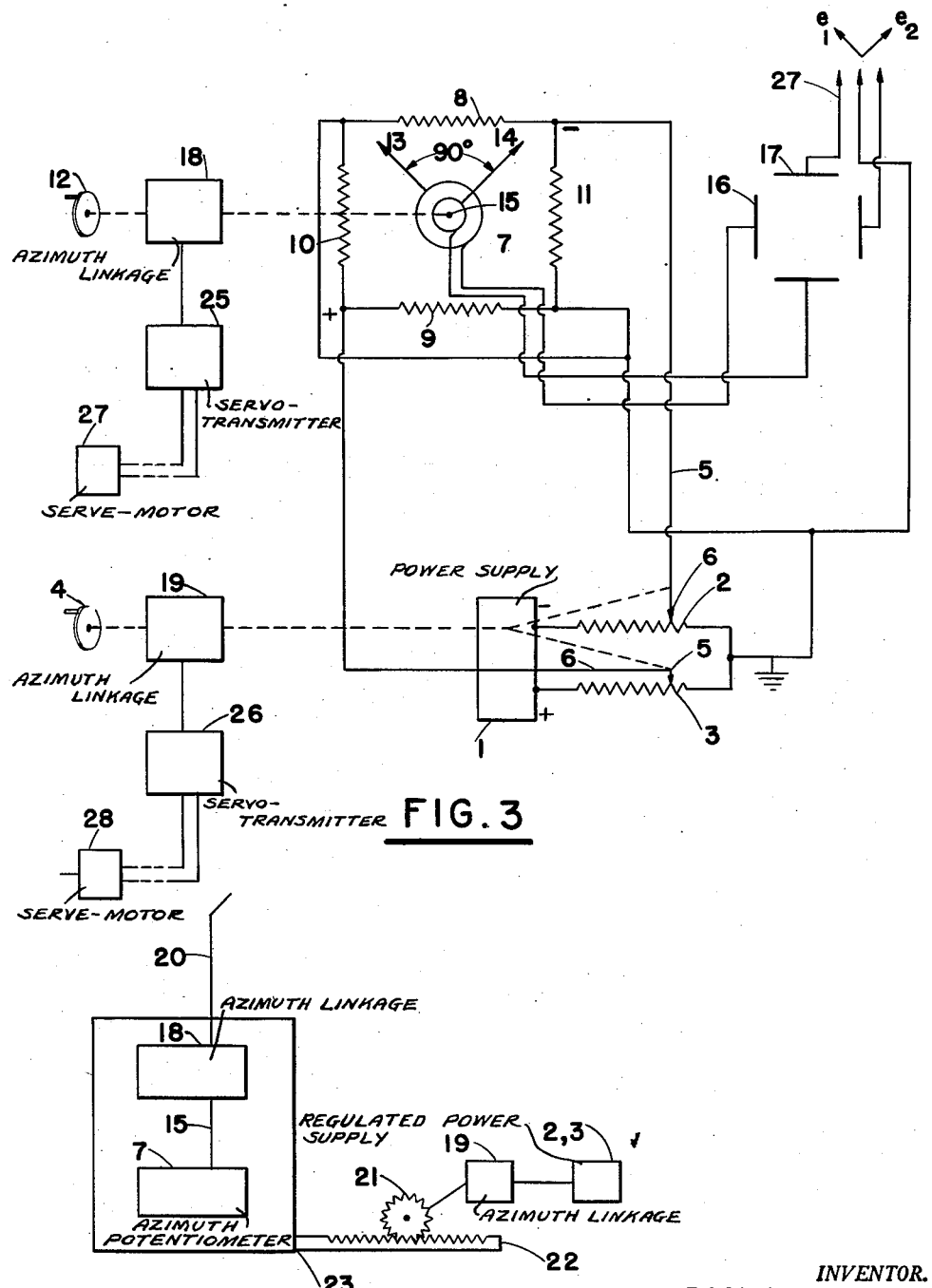

July 15, 1952  R. D. CHIPP  2,603,775
RADAR TARGET INDICATING SYSTEM FOR FIRE CONTROL
Filed Aug. 2, 1946  3 Sheets-Sheet 3

INVENTOR.
RODNEY D. CHIPP
BY
*M. O. Hayes*
Attorney

Patented July 15, 1952

2,603,775

UNITED STATES PATENT OFFICE 2,603,775

RADAR TARGET INDICATING SYSTEM FOR FIRE CONTROL

Rodney D. Chipp, United States Navy, Washington, D. C.

Application August 2, 1946, Serial No. 687,857

3 Claims. (Cl. 343—5)

(Granted under the act of March 3, 1883, as amended April 30, 1928; 370 O. G. 757)

My invention relates to radio detecting and ranging indicating apparatus and more particularly to a system for the rapid and accurate relaying of target position information from an indicating apparatus to a remote location.

One of the most important aspects of radio detecting and ranging equipment is the ability to obtain accurate range and azimuth data concerning a target, for instance, for use in gun aiming. Since the location of a detection and ranging equipment, for reasons of practicability, is frequently remote from the location of use of the data, a means of communication between the two is necessary.

In the detection and ranging equipment in use at present, a number of different indicator presentations are used and through my invention may be applied to any one of them, for purposes of explanation, I herein refer to what is known as a plan position indicator, commonly abbreviated P. P. I.

The P. P. I. scan presents in polar coordinate form a map of the area being covered with the antenna position occupying the center of the screen. The indicator tube is intensity-modulated by the output of a radar receiver, with the sweep moving from the center radially outward. The sweep direction is controlled by and synchronized with the antenna position throughout 360 degrees of rotation in such a manner that the cathode ray indicator trace initiated by the radar trigger sweeps radially outward from the center of the tube in the same direction that the maximum energy is radiated from and received by the antenna. If the cathode ray indicator pattern is presenting relative bearing with respect to the ship, the top of the screen represents dead ahead, if the antenna beam is pointing dead ahead, and the sweep moves from the center of the screen to the top. Likewise, if the antenna beam points 90 degrees to the right of dead ahead, the sweep moves from the center radially outward at an angle of 90 degrees to the right of dead ahead; thus, a polar map is developed on which the range is plotted radially against the position in azimuth, for bearing, through 360 degrees.

The above described apparatus operates to provide a bright spot on the fluorescent screen indicating a target, the distance of which from the origin gives an indication of range and the angular distance of which from the top of the indicator gives an indication of azimuth. In order to measure the range and relay this information to a position of use, the present state of the art makes use of an arrangement as follows: the rate of growth of the radial sweep of the electron beam is predetermined so that its magnitude at any instant is proportional to distance. By impressing intensity pulses on the control grid of the tube, at predetermined intervals corresponding to units of distances, calibration rings, hereinafter called range rings, are caused to appear upon the fluorescent screen, and the distance of the target can be judged from the position of the target spot relative to the range rings. Conversely, by controlling the interval of time between the start of a trace from the origin and the impression of the ring intensity pulses on the control grid, the rings may be caused to coincide with the position of the target. The mechanism which adjusts this time interval may be directly calibrated to indicate distance. If the adjustable mechanism has a rotatable shaft, range information may be relayed to a remote point by the use of a servo type follower system, such as is well known in the art, which is connected to the rotatable shaft at the detection equipment and to any suitable indicator at the desired remote location.

This system represents the present state of the art and is deficient by reason of the delay inherent in its operation of the range transmission feature. This delay arises as follows: The target indicating spot appears on the fluorescent screen for a period depending upon the persistence of the screen. The operator adjusts the range ring so that it corresponds with a position on the radial sweep which he thinks corresponds with the position of the target; but the range ring is developed by the rotating radial sweep, which necessarily has passed the target position, and no accurate adjustment is possible until the radial sweep makes a complete revolution in order to coincide with the position of the target. This time interval may be as long as 20 seconds, depending on speed of antenna rotation.

It is an object of my invention to eliminate the above described disadvantages by reducing the delay time for the relaying of information to a remote point to as low as 2 seconds.

Another object of my invention is to provide an indicating system which enables an observer operator to determine the position of a target immediately following its appearance on the indicator.

Another object of my invention is to provide a relay system whereby the information appearing on indicator is relayed to a remote point almost immediately.

A further object is to provide means for relaying the position of a number of targets to remote points without a lapse of time.

The present invention particularly contemplates a system wherein the cathode ray oscilloscope has at least two electron guns, one of which is responsive to the detection and ranging equipment and is utilized for the presentation of the normal Plan Position Indicator scan and the second of which may be externally manipulated in order that the electron beam may be caused to impinge on the screen at any desired point. Since the second electron beam may be manipulated about the fluorescent screen as a pointer, I herein term it a pointer beam. Since the pointer beam is in no way engaged in the normal Plan Position Indicator scan and is therefore always free for manipulation, no delay is involved in setting the controls so that the pointer beam will coincide with the target position. I have also found it desirable to cause the pointer beam to develop a small circle whereby a target, by suitable use of the pointer beam control, can be circumscribed. In addition, the pointer beam controls are arranged in a unique manner whereby an expeditious use of servo-type follower systems is utilized whereby the position of the target is rapidly and accurately relayed to a desired remote location of use.

The details in the construction of a preferred form of the invention, together with additional objects, and advantages thereof, will be apparent from the following description of the accompanying drawings which are chosen for illustrative purposes only and in which:

Figure 3 is a diagrammatic representation of my pointer beam control circuit mechanically connected to servo-type transmitters.

Figure 4 is an alternate embodiment of control means wherein two controls are mechanically connected with electric controls in order to cause the pointer beam to impinge upon a target spot.

Figure 1:
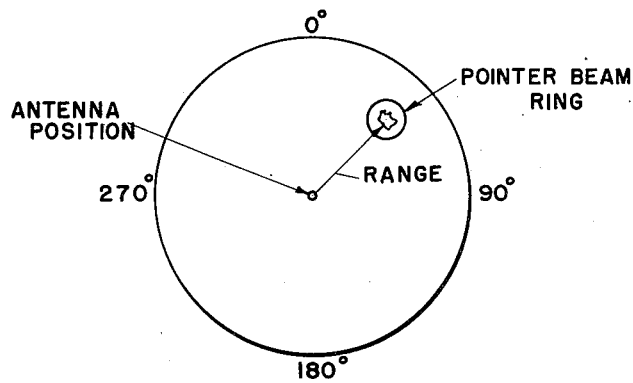
Figure 1 is a face view of a cathode ray indicator used as a plan-position-indicator and showing a target encircled by the pointer beam of my invention.

Referring to Figure 1, the radio detection and ranging presentation of a target is shown at approximately 35 degrees on a plan position indicating oscilloscope. The target is shown as developed by the Plan Position Indicator scan and is encircled by the pointer beam of my invention.

Figure 2:
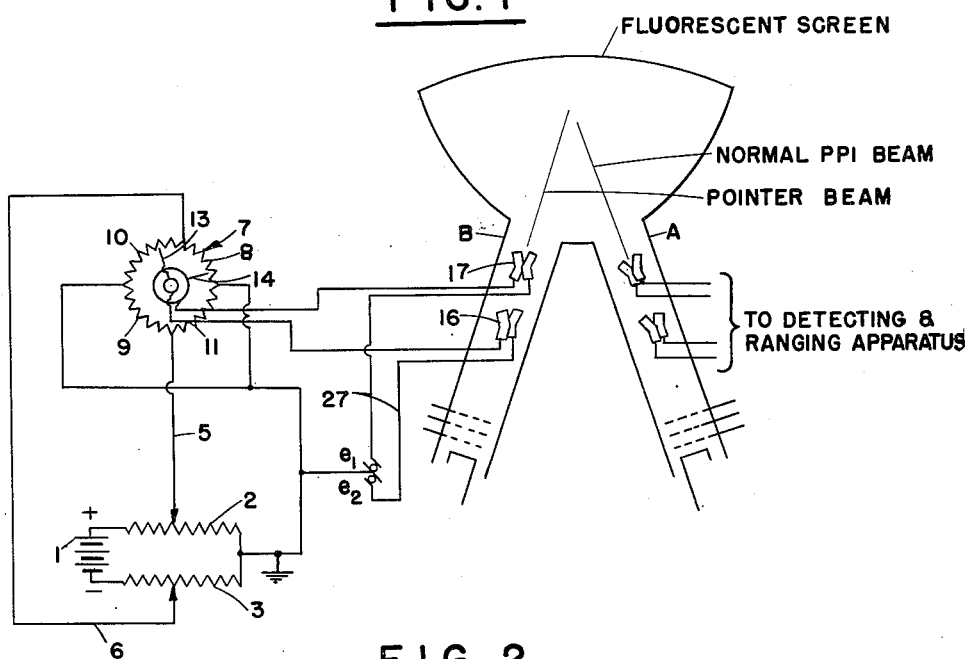
Figure 2 is a diagram of a representative type of two-gun indicator tube applicable to the present invention and shown connected to a pointer beam control circuit.

The incorporation of my apparatus in the detection and ranging apparatus is shown by Figure 2. The cathode ray oscilloscope tube is shown to have two electron guns. Electron gun A is the usual electro-magnetic or electrostatic deflection type arranged to give a Plan Position Indicator scan in the usual manner. Electron gun B provides the pointer beam, the operation of which will now be discussed.

It is desirable that the position of the pointer beam be controlled by two adjustments, one of which is an indication of azimuth relation and the other of which is an indication of range. To accomplish this, I apply to one of one pair of deflection plates a voltage which bears a sine relation to a cosine voltage applied the other pair of deflection plates. I apply a negative and an equal positive voltage to the opposite connections of four resistors 8, 10, 9 and 11 connected in series in a closed circuit. Alternate resistors have a resistance which varies with length as a sine function and the other two resistors are arranged to present cosine taper. Two rotating sliders 13 and 14 insulated from each other, and arranged at right angles are provided, thus providing in combination with the resistors a potentiometer.

One slider 13 is connected to plate 16 of one pair of deflecting plates and the other slider 14 is connected to plate 17 of the other pair of deflecting plates. The electric field acting upon the pointer beam is the vector sum of the sine and cosine related potentials applied thereto.

Rotating the azimuth potentiometer 7 rotates the direction of the resultant potential applied to the deflecting plates and therefore causes the pointer beam to move in a circle. Therefore, any position on the fluorescent screen corresponding to an azimuth location can be selected by adjustment of the azimuth potentiometer. So far, the apparatus described permits the operator to move the pointer beam in a circular path. In order to permit an adjustment in radial deflection of the pointer beam, the potentials applied to the sine and cosine potentiometer are provided by an adjustable voltage source, comprising a pair of resistors 2 and 3 connected in series across the output potential of a D. C. power supply unit, and a pair of sliding contacts 5 and 6 insulated from each other but arranged symmetrically with respect to the resistors for simultaneous and equal movement. The potentials provided by the sliding contact can be adjusted in magnitude, but will be equal and in opposite direction with respect to the common connection between the resistors. The two sliding contacts and the common connection to the azimuth potentiometer 7 are as shown in Figure 3. Movement of the common mechanical linkage of slider 5 and 6 therefore provides a control in radial deflection or range of the pointer beam.

Therefore, the apparatus provided and so far described enables the indicator observer to shift the pointer beam quickly by manipulation of the azimuth and range control so that it will impinge on a target indication.

The coincidence of the pointer beam point of impingement and the impingement of the normal Plan Position Indicator electron beam is, in the final analysis, an indication of the accuracy of the setting of the pointer beam azimuth and range controls.

I have found it desirable to arrange the pointer beam to circumscribe a small circle and I do this by applying quadrature potentials $e_1$ and $e_2$ to the deflecting plates as shown in Fig. 2 and Fig. 3. This arrangement enables the operator to encircle a target spot by manipulation of the azimuth and range controls of the pointer beam.

The relaying of the position of the controls to a remote point is sufficient to provide bearing and range information at the remote point on a suitable indicator.

One manner in which I accomplish this is illustrated in Figure 3 and is to provide an azimuth mechanism 18 provided with a crank. I provide a servo transmitter 25 which is mechanically related to the control mechanism whereby motion of the crank causes a signal to be generated by the servo-transmitter which in turn will cause a servomotor to follow at the point of use. In a similar arrangement a mechanical linkage 19, a crank 4 a servo transmitter 26 and a servomotor 28 are provided in the pointer beam range control system.

I have found it advantageous to combine the pointer beam azimuth and range control in a single control. This embodiment is shown in Figure 4, wherein the azimuth control 18 and the azimuth potentiometer 7 are actuated by rotating control 20. Range control is obtained by the lateral motion of control 20, which causes a linear motion of rack 22, which turns gear 21, whereby range resistors 2 and 3 are shifted through linkage 19.

Figure 5:
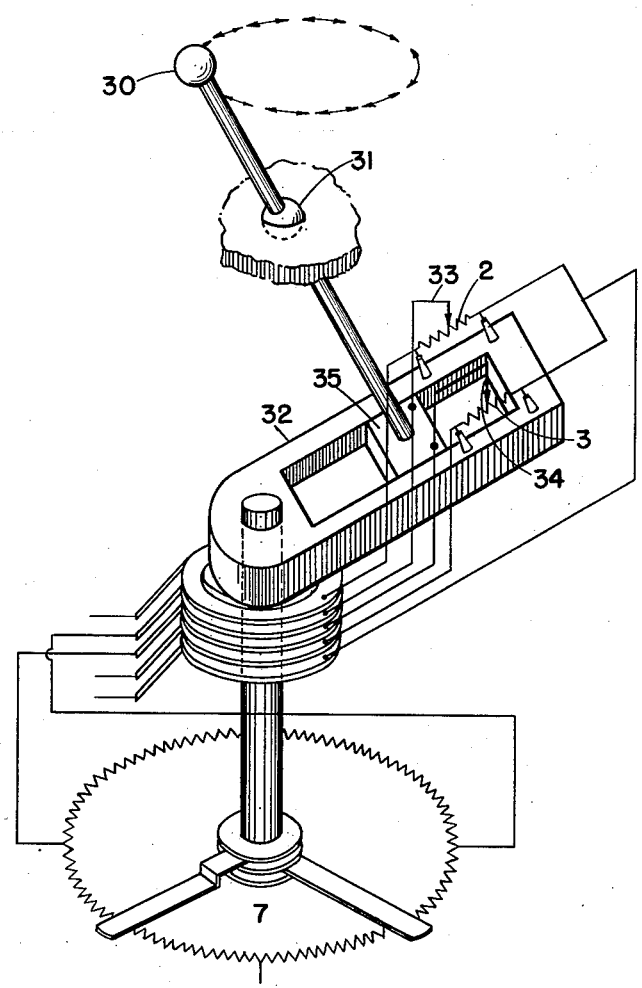
Figure 5 is still another alternate control arrangement having the advantage of simple manipulation.

Another embodiment wherein the azimuth and range controls are so arranged that a control stick need only be moved in a direction corresponding to the desired direction of movement of the pointer beam is shown in Figure 5. Herein means are provided to translate motion of control stick 30 in any direction into a rotational motion of the azimuth potentiometer 7 and a linear adjustment of the range resistors 2 and 3. This is accomplished by providing a slotted crank 32 on the azimuth potentiometer shaft. The control stick 30 is journaled in a ball joint 31, whereby it can be moved to any position. The rotational position of the azimuth potentiometer follows the azimuth position of the control stick and is independent of the distance the control stick is moved in a radial direction from the center position. The range resistors 2 and 3 are fixedly secured to the slotted crank 32, but the sliders 33 and 34 are cooperatively engaged with the block 35 of insulation material which is secured to the lower end of the control stick. Therefore, the position of the sliders on resistances 2 and 3 depends on the magnitude of radial movement of the stick and not on the azimuth position. The follower or servo mechanism through which the position of the controls are relayed to the remote point of use is not shown in Figure 5 in the interests of clarity.

In the event it is desirable to relay the position of several targets to a remote point, time sharing may be applied to the pointer electron beam, so that a multiplicity of sets of azimuth and range controls can be employed to designate a plurality of targets, i. e., the beam deflection plates 16 and 17 may be electronically switched to different targets.

It will be apparent from the foregoing description that this invention embodies a unit which is effective in enabling an operator to relay azimuth and range information accurately and rapidly from a detecting and ranging equipment to a point of remote use. Although I have herein described an illustrating preferred embodiment of the invention, it is to be understood that the invention is not limited to the precise construction set forth, but includes whatever changes fairly come within the scope of the appended claims.

The invention described herein may be manufactured and used by or for the Government of the United States of America for governmental purposes without the payment of any royalty thereon or therefor.

I claim as my invention:

1. A target position relaying system comprising a combination, a radio detecting and ranging equipment, a cathode ray indicator tube having a fluorescent screen and at least a first electron beam, and a second electron beam, said first electron beam being intensity modulated by said detector and ranging equipment and deflected in radius and azimuth on said screen to present a plan position indication, dual deflecting means for controlling the position of said second electron beam, means for applying to potential to the deflecting means, means for varying said potential on each said deflecting means periodically about an average value of adjustment thereof according to a sine relation on one of said means and according to a cosine relation on the other of said means, whereby said second electron beam is controllable in a circular path, means for adjusting the amplitude of the resultant of said two potentials whereby the second electron beam is controlled in a radial direction, and means responsive to said circular and radial control beam for relaying the position of the same to a remote location.

2. In a radio target detecting and plan position indicating and signal relaying system including a cathode ray oscilloscope viewing screen, a first electron gun responsive to impressed stimuli to represent the location of said target by a bright spot on said screen, a second electron gun for said screen wherein the electron beam executes a circular trace in response to a pair of quadrature sine wave potentials applied thereto, and wherein said electron beam is further responsive to manual control means whereby the position of the loci of impingement of said circular trace on said viewing screen is controllable, signal means cooperatively engaged with said manual control means and controlled by the instant setting thereof for generating variable electrical signals defining said setting, and indicating means responsive to said signal means located at a remote location, whereby any setting of said manual control means is indicated at said remote location.

3. A target designation system, comprising a cathode ray tube having at least a screen, and a first and second electron gun, said first electron gun energized and the beam thereof deflected to indicate a target position in polar coordinates on said screen, and said second electron gun arranged within said tube and having the electron beam therefrom to said screen deflectable in response to manual deflecting plate voltage adjustments to coincide with the indicated position of said target, means for electrically rotating the beam from the second electron gun in a circle about the manually adjusted position thereof, and means responsive to the manual adjustment of said second electron gun, for indicating said adjustment at a remote location.

RODNEY D. CHIPP.

REFERENCES CITED

The following references are of record in the file of this patent:

UNITED STATES PATENTS

| Number | Name | Date |
|---|---|---|
| 2,225,046 | Hunter | Dec. 17, 1940 |
| 2,293,899 | Hanson | Aug. 25, 1942 |
| 2,401,432 | Luck | June 4, 1946 |
| 2,416,088 | Deerhake | Feb. 18, 1947 |
| 2,419,239 | White | Apr. 22, 1947 |
| 2,427,219 | Luck | Sept. 9, 1947 |

FOREIGN PATENTS

| Number | Country | Date |
|---|---|---|
| 552,072 | Great Britain | Mar. 22, 1943 |